United States Patent [19]

Foster

[11] Patent Number: 4,527,516
[45] Date of Patent: Jul. 9, 1985

[54] DUAL FUEL ENGINE
[75] Inventor: Joseph S. Foster, West Vancouver, Canada
[73] Assignee: Pro-Staff Overload Enterprises Limited, Canada
[21] Appl. No.: 576,937
[22] Filed: Feb. 6, 1984
[51] Int. Cl.³ .............................................. F02B 49/00
[52] U.S. Cl. .............................. 123/27 GE; 123/51 R; 123/575; 123/525
[58] Field of Search ................. 123/27 GE, 575, 576, 123/577, 526, 526, 52 M, 51 R

[56] References Cited
U.S. PATENT DOCUMENTS

| | | | |
|---|---|---|---|
| 2,686,503 | 8/1954 | Reddy et al. | 123/27 GE |
| 2,927,562 | 3/1960 | Lafferty et al. | 123/27 GE |
| 2,929,366 | 3/1960 | Kotlin et al. | 123/27 GE |
| 3,698,365 | 10/1972 | Hallberg | 123/27 GE |
| 4,091,772 | 5/1978 | Heater et al. | 123/27 GE |

Primary Examiner—E. Rollins Cross
Attorney, Agent, or Firm—Spensley Horn Jubas & Lubitz

[57] ABSTRACT

A uniflow dual fuel engine including a plurality of cylinders, a piston in each cylinder, inlet ports arranged around each cylinder to be uncovered by downward movement of the piston in the cylinder. Air is forced into the cylinder through the inlet ports and there is a fuel injector to pump diesel fuel into the cylinder. There is an inlet pipe extending into one end of the port of each cylinder to end immediately adjacent the interior of the cylinder and connected at its distal end to a gas source.

11 Claims, 7 Drawing Figures

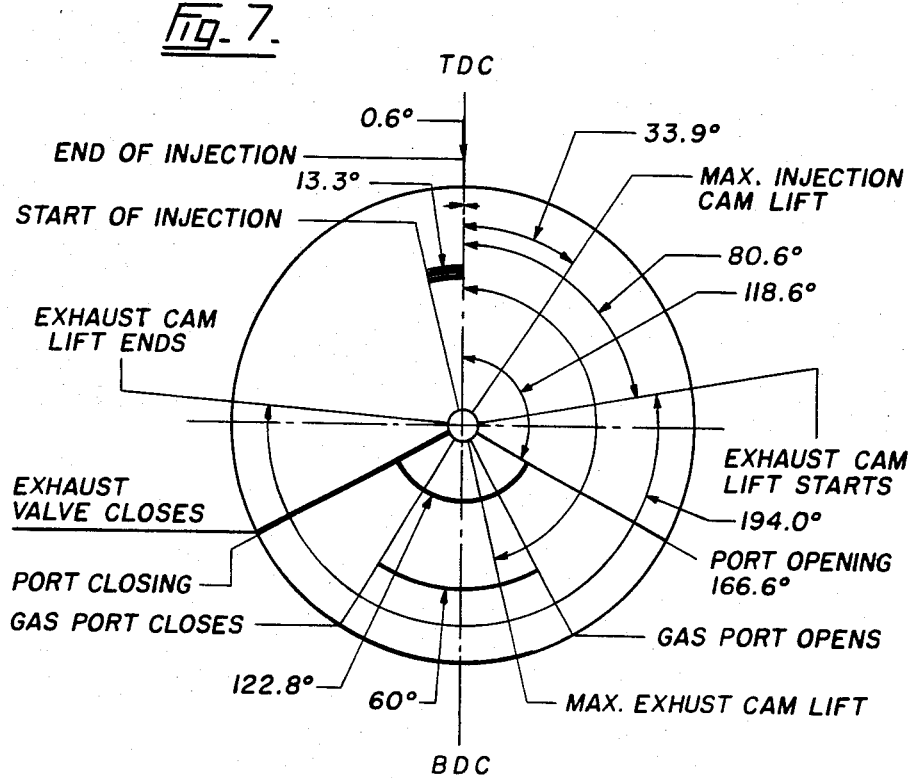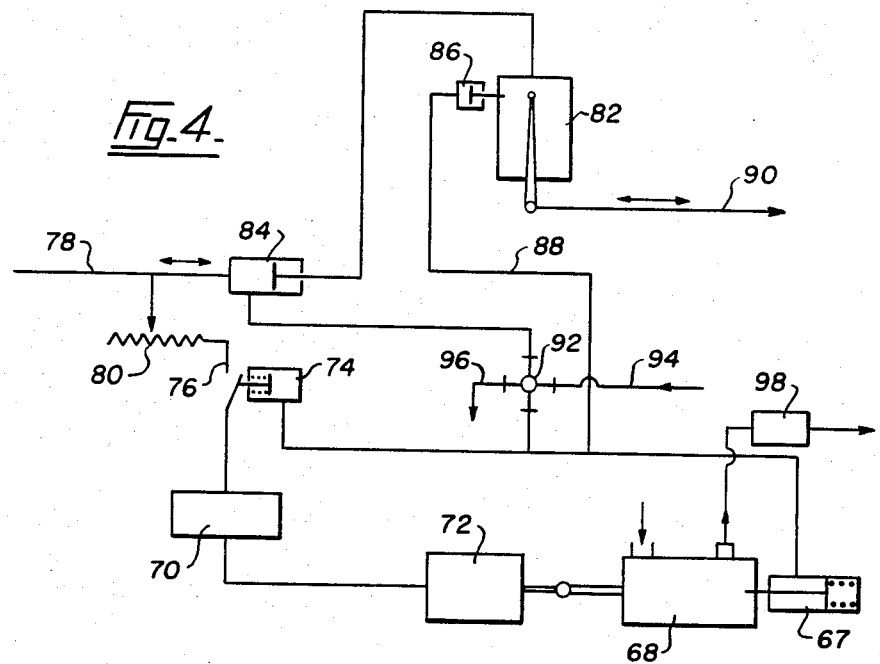

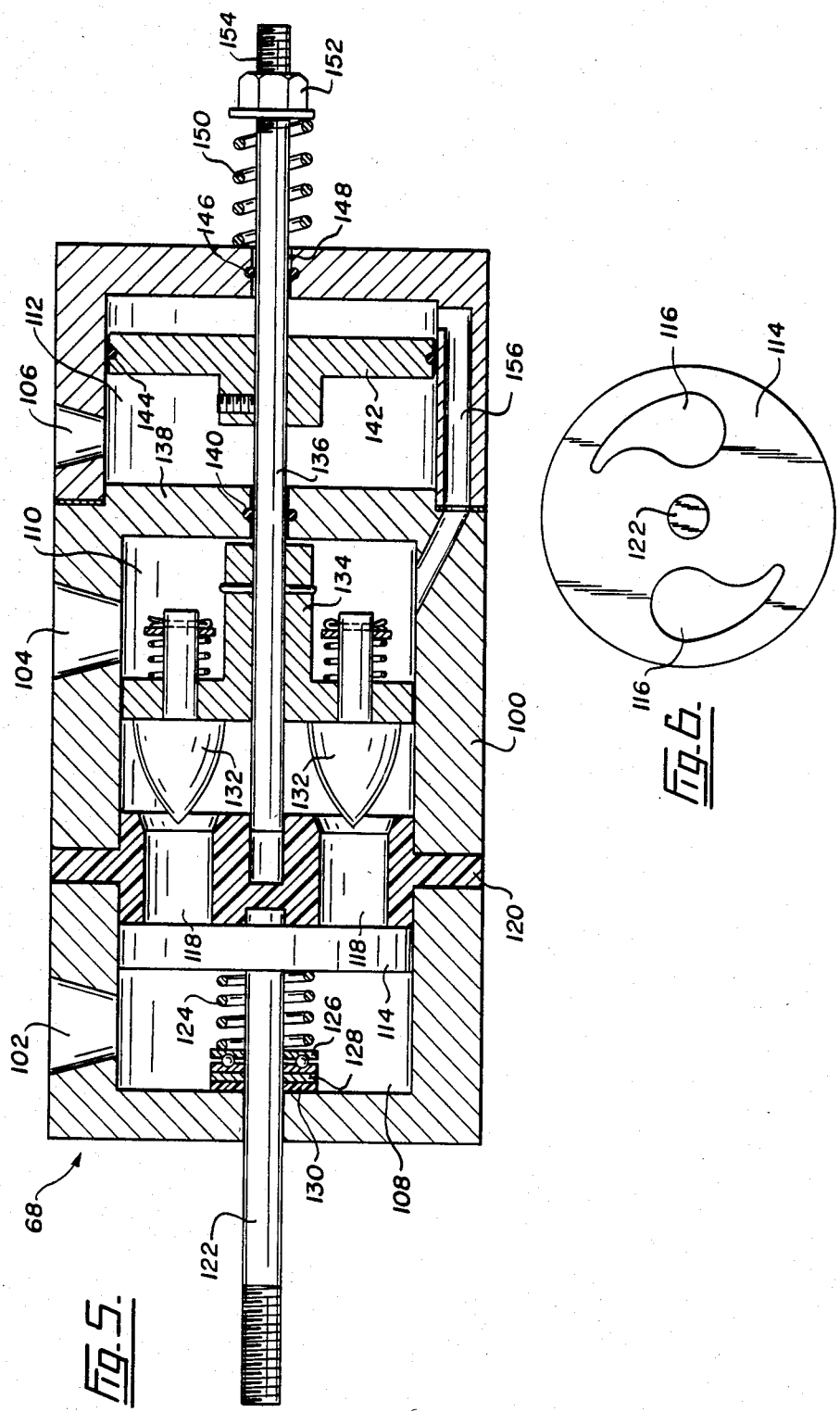

DUAL FUEL ENGINE

FIELD OF THE INVENTION

This invention relates to a uniflow 2 cycle dual fuel engine.

A uniflow engine is an engine in which the flow through the engine, from inlet to exhaust, is all in one direction, that is the inlet is at one end of the cylinder and the exhaust at the other. Dual fuel engines are also well-known, at least in the patent literature. These engines are typically two cycle diesel engines, arranged to operate in one mode on gas fuel with a small amount of diesel fuel injected to provide the necessary ignition, and in a second mode on diesel fuel alone, for example when gas fuel is not available.

DESCRIPTION OF THE PRIOR ART

Examples of patents relating to dual fuel engines are U.S. Pat. Nos. 4,176,651 to Backus; 3,225,751 to Horgen; 3,152,583 to Horgen; 3,136,305 to Kenworthy; 2,994,187 to Kegard; 2,859,739 to Froehlich; 2,803,460 to Shirley; 2,724,372 to Schowalter; 2,686,503 to Reddy; 2,927,562 to Lefferty; 2,635,589 to Klinger; 2,612,145 to Steven; 2,612,880 to Schowalter; 2,535,571 to Grieshaber; and 2,433,111 to Gehres.

The notion of a dual fuel engine is clearly attractive. There are huge numbers of diesel engines but such engines are notoriously dirty, that is their exhaust gases contain large amounts of pollutants. Furthermore, particularly in North America, the sorts of gases used in a dual fuel engine are readily available naturally where a substantial proportion of the diesel fuel used is imported.

The two cycle diesel engine is extremely popular worldwide, particularly in North America where the General Motors Detroit diesel has a substantial share of the market. However the two cycle diesel engine has always been more difficult to operate on gas fuels, for example natural gas or propane, than four cycle engines. Large bore, slow turning two cycle engines will give acceptable performance on natural gas, although not propane, but the higher speed two cycle engine has not been commercially acceptable, either for reliability or horsepower, when operating on gas. There are a number of reasons. The very short combustion cycle of the two cycle is a disadvantage. Because of the two cycle, as compared with the four cycle, the timing of events is naturally much faster. An inability to scavenge the combustion chamber of combustion gas sufficiently prior to recharging the chamber with fresh air is displayed. There are higher piston and exhaust valve temperatures due to the short scavenging, and thus cooling, cycle. This leads to hot carbon deposits on the piston, on the exhaust valve and on the cylinder head which produces pre-ignition and thus detonation in the combustion chamber, the familiar "pinging". There is typically a higher oil consumption rate, certainly compared with four cycle engines, which produces oil vapours in the combustion chamber. This again can lead to pre-ignition of the gas charge and the building up of carbon deposits, again facilitating pre-ignition and detonation. Natural gas, and to a lesser extent propane, has a much slower flame rate than diesel fuel, that is natural gas is a slow burning fuel, and this has proved a considerable disadvantage.

All of these above conditions contribute to inconsistent combustion in the two cycle dual fuel engine and thus non-uniform firing pressures.

The erratic combustion cycle of a dual fuel two cycle engine will not necessarily result in a non-uniform power output at the flywheel of the engine. However it can produce extremely detrimental conditions within the engine. Components such as pistons, piston rings, cylinder heads, bearings, cylinder valves and the like can all be damaged and, in any event, are prone to a much shorter operating life.

A diesel engine normally operates with an excess of air in the combustion chamber but the dual fuel engine must have a gas-air mixture ratio within the combustion limits for this fuel. This means that the flow of air into the combustion chamber must match the quantity of fuel present, which in turn determines the horsepower of the engine. Too lean a mixture results in misfiring, reduced power output and poor thermal efficiency. Too rich a mixture results in detonation, which, besides producing less power, produces forces destructive to engine components. The optimum gas-air ratio is achieved when an engine is operating close to the detonation limit but without detonation occurring. The combustion tolerance for the gas-air ratio for good combustion in a high performance engine is very narrow and becomes even more demanding as brake mean effective pressure and the compression ratio increase. At the higher output levels it becomes increasingly necessary to control the density of the combustion air for all load, speed, torque, horsepower and external or ambient conditions. Density of the air is usually controlled by controlling its temperature. To have a high horsepower output usually requires additional inter-cooling of the combustion air to maintain a consistent air density and thus a proper gas-air ratio. This maintenance of a consistent gas-air combustion ratio under all conditions has always been a major obstacle to overcome with natural gas engines. The failure to produce a viable commercial form of these inventions may well be attributed to this fact. Certainly there is not a natural gas engine that has output and performance characteristics comparable to the pure diesel engine.

The most demanding conditions occur under maximum load and speed changes, for example during rapid acceleration and the performance of the diesel engine under these conditions is much superior to prior art dual fuel engines. The easiest conditions to handle are those met when an engine is operating at constant speed and constant horsepower, for example on engines driving an irrigation pump. The next easiest set of conditions is encountered when an engine is operating at constant speed but with a variable power output, for example an engine powering a generating set. As indicated above the most demanding conditions are found when there is variable speed, variable torque, variable horsepower and variable ambient conditions. These conditions are, of course, precisely the conditions met by an engine in a bus or heavy duty truck. The dual fuel engine under these conditions must have extremely precise control over the several variable combustion functions. There is small tolerance for error.

A further fact that must be taken into consideration with a dual fuel engine is the ignition timing. Contrary to most internal combustion engines natural gas engines must have the timing progressively retarded as the power output increases. This is because natural gas burns quite slowly compared with fuels such as diesel fuel or gasoline. The actual flame front speed for natural gas is only about one third that of diesel fuel. If the ignition timing is not retarded for higher outputs the major portion of the gas charge becomes compressed and heated by the early ignition and then explodes, that is detonation occurs. Hot carbon or improperly designed or constructed parts also contribute to pre-ignition. For example sharp edges on piston crowns can be a factor. Detonation pressures reach two to three times normal firing pressures and if allowed to continue can be catastrophically destructive.

Ignition timing is of paramount importance for good thermal efficiency. For a dual fuel engine to be efficient it must operate close to its detonation limitation, that is it must have optimum mixture ratio and optimum timing for all loads and conditions.

It is clear from the above that the ideal conditions for engine operation are quite close to very poor conditions. The engine designer must ensure that an engine can operate as close as possible to detonation but must at the same time avoid detonation. How close an engine can come to operating in this way will depend on the precision with which fuel ignition, ignition timing and gas air ratio can be controlled for several operating conditions. The significance of these problems must be fully appreciated when evaluating the success achieved by a dual fuel engine. The absence of even one of the several controlling factors can render the entire performance of the engine unacceptable. For example failure to compensate for air density on a hot day can cause severe detonation.

The above indicates some of the reasons why dual fuel engines have achieved little commercial significance. Certainly where diesel engines have done well, for example in public transport vehicles and heavy duty trucks, the dual fuel engine simply has not been able to perform in a manner that is adequate.

Reddy and Harrison in U.S. Pat. No. 2,686,503 issued Aug. 17, 1954 describe and claim a dual fuel engine in which natural gas is supplied by a fuel nozzle to a scavenge port of a two cycle engine. This is the closest prior art known to applicant and yet demonstrates the inadequacy of previous approaches. Reddy et al is inefficient in converting the energy of natural gas into useful work in that a significant proportion of the gas fuel is wasted; it is carried out of the exhaust system with the scavenging air. As will be readily appreciated the scavenging air in a uniflow two stroke engine is the initial charge of air used to remove previously combusted gases. Reddy et al shows the gas nozzle terminating at the outer surface of the cylinder port with a gasket interposed between the end of the nozzle. The end of the nozzle is thus some distance from the interior of the cylinder and thus the piston. This is believed to be a marked disadvantage with the Reddy et al invention. Further with the Reddy et al invention gas is applied to the entire area of the inlet port, which provides no control over gas mixing with the scavenge air, with the consequent disadvantage of waste. The Reddy et al invention requires an external counterbore around the port area to receive a gasket. However in a typical uniflow engine the cylinder liner has random position and this requirement for the machining of an external counterbore necessitates the cylinder liner being carefully positioned in the engine. This is believed to be a commercial disadvantage with the Reddy et al suggestion. Further the Reddy invention, to provide a gas seal at the port, imposes considerable pressure on the cylinder liner. Any gasket used as a seal must, of course, be compressed. Such pressure can distort the liner in the critical port area and can thus be detrimental to the engine's performance.

SUMMARY OF THE INVENTION

The present invention provides a uniflow dual fuel engine that in tests conducted has shown complete dual fuel capabilities. The engine can be switched from full diesel to full dual fuel and back to diesel under full load conditions with no interruption in the power output of the engine. Indeed tests indicate that the maximum horsepower capability is actually increased in the dual fuel mode.

Accordingly, the present invention is in a uniflow dual fuel engine including a plurality of cylinders, a piston in each cylinder, inlet ports arranged around each cylinder to be uncovered by downward movement of the piston in the cylinder, means to force air into the cylinder through the inlet ports and a fuel injector to pump diesel fuel into the cylinder and is the improvement comprising an inlet pipe extending into one end of the port of each cylinder to end immediately adjacent the interior of the cylinder and adapted to be connected at its distal end to a gas source.

BRIEF DESCRIPTION OF THE DRAWINGS

Aspects of the invention are illustrated, merely by way of example, in the accompanying drawings in which:

FIG. 4 illustrates schematically the throttle control system for an engine according to the present invention;

FIGS. 5 and 6 show a gas control valve; and

FIG. 7 illustrates the typical timing diagram for a uniflow two cycle diesel engine modified according to the present invention.

DESCRIPTION OF THE PREFERRED EMBODIMENT

Figure 1:
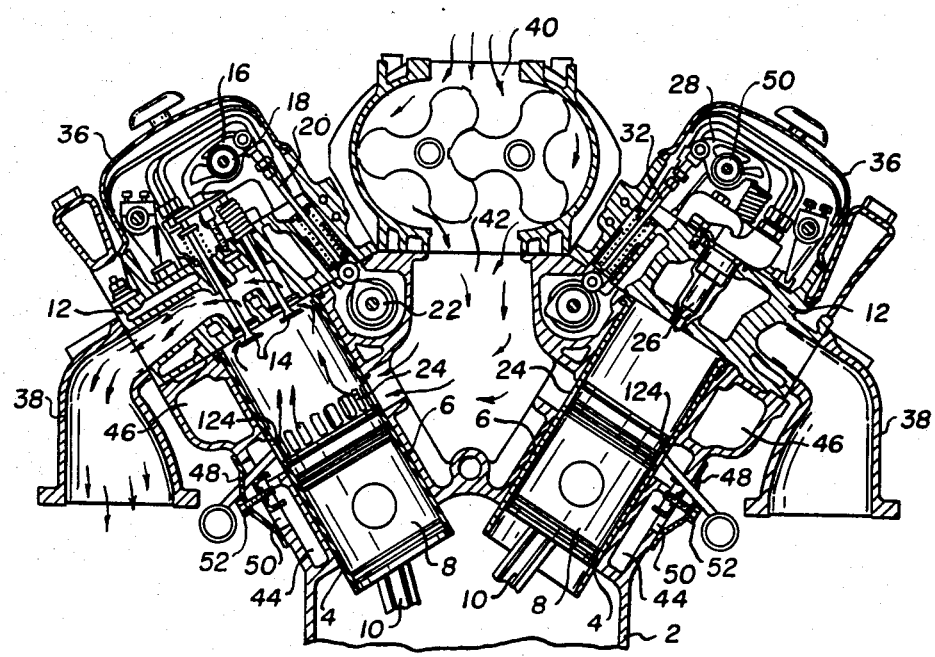
FIG. 1 is a section through a conventional uniflow two cycle diesel engine modified in accordance with the present invention.

FIG. 1 illustrates a typical two cycle diesel engine modified according to the present invention. In its conventional components the engine comprises a block 2 formed with cylinder openings 4 to receive liners 6 to receive pistons 8 attached to connecting rods 10. The crankshaft and the remainder of the bottom of the engine are not shown.

The engine is of V configuration with cylinder heads 12. One cylinder head 12 is shown with exhaust valves 14 driven in conventional manner from rockers 16 pivoting on rocker shaft 18 driven by pushrods 20 from crankshaft 22. There are conventional inlet ports 24 in each liner 6. The inlet port lower edge is just above bottom dead centre for piston travel. The cylinder shows the conventional operation of a fuel injection pump 26 by a rocker 28 pivoting on roller shaft 50 and driven by pushrod 32 movable by cam 34. There are conventional rocker covers 36 and exhaust manifolds 38. The engine, as is common with two cycle diesel engines, is supercharged by the provision of a Roots type supercharger 40 forcing air into air chamber 42 and air jackets 44, which surround ports 24, and, depending on the position of the pistons, through the ports 24. The supercharger 40 is conventionally driven by sprocket or gear drive from the crankshaft (not shown).

Again as is conventional the engine block 2 has openings 46 to receive coolant. Furthermore there is a plate 48 positioned over openings 50 in the air jackets 44 surrounding the lower part of each cylinder. Bolts 52 locate the plates 48. The removal of the plate 48 provides access to the inlet ports 24.

In the particular engine illustrated the direction of air flow is shown by the arrows.

A gas inlet pipe 54 extends through inspection plate 48 through the air jacket 44 and into one inlet port 124 of each cylinder liner 6. The arrangement is shown in more detail in FIGS. 2 and 3.

Figure 2:
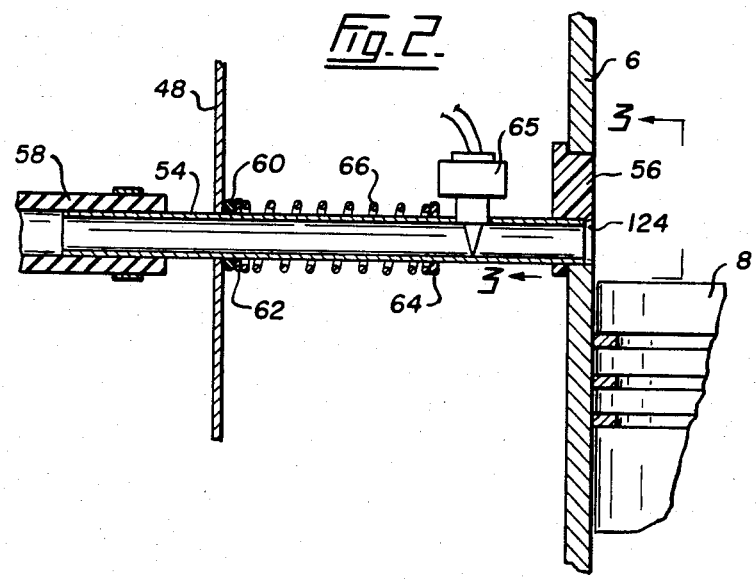
FIG. 2 is a sectional detail of an engine modified according to the present invention.
Figure 3:
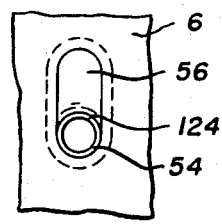
FIG. 3 is a view on the line 3—3 in FIG. 2.

As shown in these figures the inlet pipe 54 extends from the exterior of the engine, outside inspection plate 48, to end practically flush with the interior of the cylinder liner 6, adjacent the piston 8 for the majority of piston travel. The pipe 54 is located by port seal 56 received within the inlet port 124 of the cylinder liner 6 and locating the pipe 54 so that its upper edge is spaced substantially below the upper edge of the inlet port. At its distal or outer most end the pipe 54 is located to a flexible gas line 58 leading to a source of fuel gas, for example propane or natural gas, the latter being preferred. As shown in FIG. 2 there is an O-ring 60 around the pipe 54 where it passes through the inspection plate 48. An annular member 62 is a slide fit on the pipe 54 and there is a fixed annular flange 64 located on the pipe 54. A light spring 66 is located between the member 62 and flange 64 to locate and apply mild pressure to the O-ring.

FIG. 2 also shows an optional feature of the present invention namely an electronically controlled gas admission valve, shown schematically at 65, mounted on pipe 54. The valve 65 provides a greater degree of control of the amount of gas and the timing of the gas entry during the combustion cycle. This precise control will be beneficial on certain high horsepower dual fuel engines where the quality of the gas fuel may not be consistent, e.g., (a) where the heat valve (BTUs/cu.ft.) of the natural gas varies; (b) where the quality of propane (used as engine fuel) varies; or (c) for other types of fuel such as Butane.

FIG. 4 illustrates the throttle control system for an engine using the system according to the present invention. The system comprises a supply of gas, not shown, and a supply of diesel fuel. There is gas shut off valve 67 and a gas regulating valve 68. Typically a pressure regulating valve (not shown) is able to reduce pressure of gas supplied to the regulating valve 68 by a factor of about a thousand fold, for example typically from a gas supplied pressure of about 3000 psig. to a gas line pressure in the region of 0 to 20 psig. There is an electric governor 70 and an actuator 72 for the governor 70. There is a pressure sensitive switch 74 operated by engine oil or air supply pressure from a changeover valve 92 to contact 76. A throttle linkage 78 attaches to resistor 80 and is attached to a conventional diesel fuel governor 82 by telescopic joint 84. There is a pilot fuel limiter stop 86 actuated by engine oil or air pressure from control valve 92. The diesel governor attaches to the conventional fuel rack 90 of the diesel engine.

The changeover control valve 92 is the means of changing the engine operation from full diesel fuel to dual fuel and back again.

The system functions as follows. Engine oil pressure or air pressure acts on changeover control valve 92 through line 94 to provide a direct control linkage between the throttle linkage 78 and the engine governor 82 through telescopic joint 84 maintained as a substantially rigid connection by the application of pressure. During the full diesel mode the gas control system remains deactivated. The system is fail safe to the diesel mode. Drain line 96 drains oil or air used to activate control valve 92.

To operate on dual fuel changeover valve 92 is activated by a remote switch (not shown) which deactivates the normal throttle linkage 78 by removing oil or air pressure from telescopic joint 84. In this mode valve 92 activates the gas shut off valve 67, nullifying the gas shut off feature, to control valve 68 and allowing it to be operated by actuator 72. Control valve 92 also activates pressure sensitive switch 74 to close the gas control circuit for electric governor 70. Pilot fuel limiter stop 86 is actuated on the mechanical governor 82 to set the pilot fuel level for the engine.

Under these conditions engine speed and load control is provided solely by resistor 80, actuated by throttle linkage 78 operating governor 70 and actuator 72 for gas regulating valve 68. The gas regulator valve 68 incorporates detonation control device 98 shown separately in FIG. 4 but conveniently built into regulating valve 68.

FIGS. 5 and 6 illustrate an embodiment of the gas regulating valve 68 incorporating a detonation control device.

Valve 68 comprises a body 100 having a gas inlet 102, a gas outlet 104 and a boost air inlet 106. The gas inlet 102 communicates with a first chamber 108, the gas outlet 104 communicates with a second chamber 110 and the boost air inlet 106 communicates with a third chamber 112. There is a disc 114 controlling communication between chambers 108 and 110. The disc 114 has openings 116, shown in FIG. 6, to align with openings 118 formed in a barrier 120. The disc 114 is rotated by governor 72 acting on shaft 122. The disc 114 is located by spring 124 acting against thrust bearing 126. A washer 128 and a seal 130 are provided to avoid leakage of gas past shaft 122. Openings 118 in barrier 120 are closeable by valve members 132 mounted on carrier 134 located on and movable with a shaft 136. Shaft 136 extends through wall member 138 between the second and third chambers 110 and 112 and is sealed by O-ring 140. A piston 142 is mounted in the third chamber 112 and is a gas tight fit within that chamber by the provision of O-rings 144. O-rings 146 seal the opening 148 in the third chamber 112 through which rod 136 passes.

There is a control spring 150 that can be compressed or extended by tightening or loosening nut 152 on threaded portion 154 of the shaft 136. A passageway 156 communicates the second chamber 110 with that part of the third chamber 112 not communicating with boost air, that is the outermost part of the third chamber 112.

Gas regulating valve 68 controls precisely the flow of gas when the engine is running under dual fuel mode. It thus controls the speed and the power output of the engine under all load and load change conditions. The gas supply for the engine at a pressure of, for example, 5 to 30 psig. enters the first chamber 108. Flow of that gas from the first chamber 108 to the second chamber 110 is controlled by rotation of the disc 114 on the shaft 122. Gas in the chamber 110 passes from the outlet 104 to be combusted in the engine. However some of the gas flows through passageway 156 to beyond piston 142 to move the piston 142, and thus rod 136, carrier 134 and valve members 132 tend to close the openings 118 in barrier 120. The boost air fed into the third chamber 112 acts against the gas pressure, that is to tend to move the valve 132 members to open the openings 118. Thus as boost pressure increases with increasing revolutions of the engine and increased horsepower increased boost pressure will enter the third chamber 112 on the left of the piston in FIG. 5 to move the rod 136 to open the openings 118 to allow gas flow from the first chamber 108 to the second chamber 110 to the engine. When boost air is low gas flow will be restricted by its own pressure acting to move the valve members 132 to tend to close the openings 118 until such time as the air boost pressure increases. Spring 150 provides a control for externally adjusting the rate of gas flow dependent upon boost pressure.

The gas regulating valve 68 thus provides precise control over the gas flow and, in particular, matches it exactly to the combustion air or boost pressure thus avoiding problems with detonation.

As far as the driver of the engine according to the present invention is concerned the operation is precisely as for conventional diesel engine and this is a particular virtue of the present invention. The system according to the present invention comprises complete dual fuel capability. The engine can be switched from full diesel to dual fuel and back to diesel under full load conditions with no interruption of the power output of the engine. Experiments show that the engine's maximum horsepower capabilities actually increased in the dual fuel mode. The thermal efficiency of the engine is improved in the dual fuel mode. Exhaust temperatures are significantly below in the dual fuel mode for the same power output. This provides longer engine component life and hence lower maintenance cost. Objectionable exhaust smoke and smells are eliminated under dual fuel. The exhaust emissions are substantially lower. In fact the present invention's great advantage is that it uses the inherent design characteristics of the two cycle diesel uniflow engine and avoids the elaborate and complicated precision controls normally associated with dual fuel equipment.

It is believed that these advantages arise from the following features:

The gas entry system supplies the gas fuel directly into the combustion chamber beneath the flow of scavenger air. That is natural gas enters the combustion chamber through a single port only during a brief interval when the piston is near the bottom dead centre position and only during a portion of the time that the remaining inlet ports supplying scavenge and combustion air to the cylinder. In this regard attention may be directed to FIG. 7 which is the engine timing diagram. It should be emphasized that the valve timing of the engine is not in any way changed by the present invention. Thus the diagram is entirely conventional but is supplemented by references to the gas port opening and the gas port closing. As to the rest no explanation of the valve timing diagram is believed to be necessary.

The above means that in effect the natural gas only mixes with the combustion air, not with the scavenge air. This is a vitally important factor as it avoids the waste of gas fuel which would occur if the fuel were allowed to mix with the scavenge air.

Because the gas in the pipe fits snugly inside one of the inlet ports of each cylinder liner, and extends right through the port to end immediately adjacent the piston proper control over the gas flow and the timing of its entry into the combustion chamber is achieved.

Because the inlet pipe terminates immediately adjacent the piston the piston crown and the skirt of the piston act as an efficient gas admission timing valve.

The design of the gas inlet pipe, its terminal location inside the cylinder port, adjacent the piston, and the natural flow of scavenging combustion air through adjacent ports combine to create a low pressure vortex immediately inside the combustion chamber. This has been proved to exist when actual load tests established that only a very low gas pressure is required to satisfy the fueling requirements of the engine, even at a high overload. Thus the void or vacuum created by the position and design of the gas entry pipe tends to draw the gaseous fuel into the combustion chamber. This is probably the greatest single contributing factor to the excellent performance achieved by the dual fuel two cycle engine according to the present invention. It is the particular arrangement of the inlet pipe according to the present invention that creates this condition. It is theorized that the effect is similar to the "eye of a hurricane" effect, that is an area of relative calm and low pressure in the centre of an otherwise violent storm, for example a hurricane. The present invention creates such conditions during the combustion cycle of the engine. The effect occurs at the end of the power exhaust cycle and at the beginning of the intake compression cycle. It is calculated that it exists for about one over two hundredths of a second, which by actual tests, has proved to be sufficient time for the natural gas fuel to enter the calm area in the combustion chamber. The pocket of natural gas then quickly mixes with the combustion air in the cylinder, not the scavenger air, to provide a homogenous mixture of gas and air essential for good combustion. The presence of the calm conditions at the downstream end of the gas pipe has been confirmed by tests. Furthermore the present invention supplies very cold natural gas directly into the combustion chamber. The chilling effect of this gas makes a significant contribution to the creation of the low pressure area directly adjacent the gas inlet pipe.

Test carried out with the present invention have indicated that no (or very little) unburnt gaseous fuel is carried out of the exhaust system by the scavenging air. This can also be shown to be true by a theoretical examination of the events of the combustible cycle of the uniflow engine. With the uniflow engine the inlet ports and the exhaust valve close virtually simultaneously as is clear from the valve timing diagram. The time interval between gas entry and exhaust valve closing is calculated to be approximately one over two hundredths of a second at 1800 rpm. As the calm area referred to above also exists for approximately the same time it follows that there is insufficient time for the gas to reach the exhaust valves before they close. Tests show that gas entry pressure, under overload conditions, is less than 1 psi over air box pressure. Therefore the gas entering the combustion chamber has little inertia energy.

The present invention supplies cold natural gas directly into the lower part of the combustion chamber where it mixes homogenously with the combustion air. The coldness of the gas arises in an elementary manner. The fuel is supplied from compressed gas cylinders that are about three thousand psig and is pressure regulated down to a low pressure, for example 3 psig at the gas inlet pipe at full load. It follows that the gas is subject to the Joule Kelvin effect and considerable cooling. Tests indicate that the pressure regulator should be heated to avoid freezing by the formation of frost on the gas supply lines. This very cold gas makes several beneficial contributions to the combustion cycle. For example it helps create the calm area referred to above. It clearly reduces the temperature of the combustion and air charge in the cylinder and, in particular reduces exhaust gas temperature. Tests indicated that exhaust temperatures were 200° F. lower on a dual fuel than on diesel fuel at the same power output, namely full load. These lower exhaust temperatures significantly extend the operating life of the engine and reduce maintenance costs. Further the cold gas stabilizes combustion, which in turn produces more uniform firing pressures. It raises the detonation level and hence load carrying capacity of the engine. 30% Overload over diesel rating was easily carried by the engine without a single indication that the detonation limitation was being approached. Fuel, or thermal, efficiency was improved 11%.

A summary of the results achieved is as follows:

Four sets of results were taken. First at no load, with the engine running at about 1800 rpm with pilot fuel only and gas. The exhaust was measured for carbon monoxide, carbon dioxide, oxygen and raw methane content. The second run was at 60 kw of power. The third run at 75 kw of power and the fourth at 95 kw. The results achieved were as follows:

|  | Run 1 | Run 2 | Run 3 | Run 4 |
| --- | --- | --- | --- | --- |
| Carbon dioxide | 1.22% | 3.52% | 3.83% | 4.45% |
| Carbon monoxide | Trace | 0.09% | 0.09% | 0.11% |
| Oxygen | 20.42% | 15.73% | 15.24% | 14.15% |
| Raw Methane | 0.1% | 1.65% | 1.73% | 1.62% |

For comparison purposes it may be noted that the maximum allowable amount of raw methane under EPA regulations is 7.5%. Thus the present invention is believed to provide the first practical means of providing a dual fuel engine suitable for all circumstances in which the diesel has proved to be so useful. An engine of V configuration is shown and was under the tests but the invention is not restricted to that configuration of the cylinders.

I claim:

1. In a uniflow dual fuel engine including a plurality of cylinders, a piston in each cylinder, inlet ports arranged around each cylinder to be uncovered by downward movement of the piston in the cylinder, means to force air into the cylinder through the inlet ports and a fuel injector to pump diesel fuel into the cylinder the improvement comprising an inlet pipe extending into one end of one inlet port of each cylinder to end immediately adjacent the interior of the cylinder and adapted to be connected at its distal end to a gas source;

a seal located in said one inlet port and contacting the inlet pipe to maintain the inlet pipe in a defined position in which the inlet pipe's upper edge is spaced below the upper edge of the inlet port whereby downward movement of the piston allows air through the inlet ports before said one inlet port is uncovered and upward movement of the piston closes the said one inlet port before all other inlet ports are completely closed.

2. An engine as claimed in claim 1 including a supply of gas to feed through the inlet pipe to the said one inlet port;

a pressure regulator between the supply of gas and the inlet pipe.

3. An engine as claimed in claim 2 in which the pressure regulator reduces pressure from the container to the inlet pipe about one thousand fold.

4. An engine as claimed in claim 1 including a throttle control system.

5. An engine as claimed in claim 4 in which the throttle control system includes a changeover control valve to regulate operation between the diesel fuel and dual fuel mode.

6. An engine as claimed in claim 5 in which the changeover control valve includes a detonation control device.

7. An engine as claimed in claim 6 in which the changeover control valve comprises:

a first chamber to receive gas;

a second chamber to receive gas from the first chamber and to pass the gas to the engine;

first control means, responsive to throttle position, to control gas flow between the first and second chambers;

second control means, responsive to air pressure of the means to force air into the cylinder, to control gas flow between the first and second chambers.

8. An engine as claimed in claim 7 in which the first control means comprises a rotatable disc comprising a body portion with openings formed in it;

a wall between the first and second chambers;

openings in the wall to align with the openings in the disc to allow gas flow or to align with the body of the disc to prevent gas flow.

9. An engine as claimed in claim 8 in which the second control means comprises at least one valve member movable to close or open the openings in the second wall;

a third chamber;

a piston in the third chamber;

a rod extending from the piston to the valve member;

a first inlet in the third chamber to receive air from the means to force air into the cylinder on a first side of the piston;

a second inlet in the third chamber to receive gas from the second chamber on a second side of the piston whereby the third chamber provides means to regulate gas flow into the engine by movement of the piston, and thus of the valve member, in response to the difference between air and gas pressure.

10. An engine as claimed in claim 1 including a valve arranged in the inlet pipe to provide fine control of gas flow in the pipe.

11. In a uniflow dual fuel engine including a plurality of cylinders, a piston in each cylinder, air inlet ports arranged around each cylinder to be uncovered by downward movement of the piston in the cylinder, means to force air into the cylinder through the air inlet ports, a fuel injector to pump diesel fuel into the cylinder and at least one gas inlet port to be uncovered by downward movement of the piston in the cylinder and communicating with a supply of gas, the improvement comprising the gas inlet port having its upper edge spaced below the upper edges of the air inlet ports whereby downward movement of the piston allows air through the air inlet ports before the gas inlet port is uncovered and whereby upward movement of the piston completely closes the gas cylinder port before the air inlet ports are completely closed.

* * * * *

UNITED STATES PATENT AND TRADEMARK OFFICE
CERTIFICATE OF CORRECTION

PATENT NO. : 4,527,516
DATED : July 9, 1985
INVENTOR(S) : Joseph S. Foster

It is certified that error appears in the above-identified patent and that said Letters Patent are hereby corrected as shown below:

On the title page, the Assignee should be:

--Pro-Staff Fuels Ltd.--

Signed and Sealed this

Twenty-second Day of October 1985

[SEAL]

Attest:

Attesting Officer

DONALD J. QUIGG

Commissioner of Patents and Trademarks—Designate